United States Patent [19]

Hefer

[11] Patent Number: 4,525,819
[45] Date of Patent: Jun. 25, 1985

[54] HORIZONTAL GEOPHONE TRANSDUCER ASSEMBLY

[75] Inventor: Fred W. Hefer, Houston, Tex.

[73] Assignee: Oyo Corporation, U.S.A., Houston, Tex.

[21] Appl. No.: 447,095

[22] Filed: Dec. 6, 1982

[51] Int. Cl.³ .............................................. H04R 9/00
[52] U.S. Cl. .................................... 367/188; 367/171; 367/173
[58] Field of Search ............... 367/188, 171, 173, 177, 367/184, 186

[56] References Cited

U.S. PATENT DOCUMENTS 2,610,240 9/1952 Pottorf ................................ 367/173
3,283,293 11/1966 Pavey, Jr. et al. ................... 367/172
3,445,809 5/1969 McLoad .............................. 367/188
4,326,275 4/1982 Butler ................................. 367/173

FOREIGN PATENT DOCUMENTS 231130 3/1969 U.S.S.R. .............................. 367/188

Primary Examiner—Theodore M. Blum
Attorney, Agent, or Firm—Michael P. Breston

[57] ABSTRACT

The geophone transducer comprises in combination: a geophone capable of detecting horizontal seismic waves, and a rigid casing having a gimbal chamber. A gimbal is provided inside the chamber on which the geophone is mounted for limited free angular movement in one direction only. The gimbal includes in one preferred embodiment a viscous liquid in which the geophone is only partially submerged while it is supported by a U-shaped bracket which is mounted for rotation about a fixed axis.

3 Claims, 8 Drawing Figures

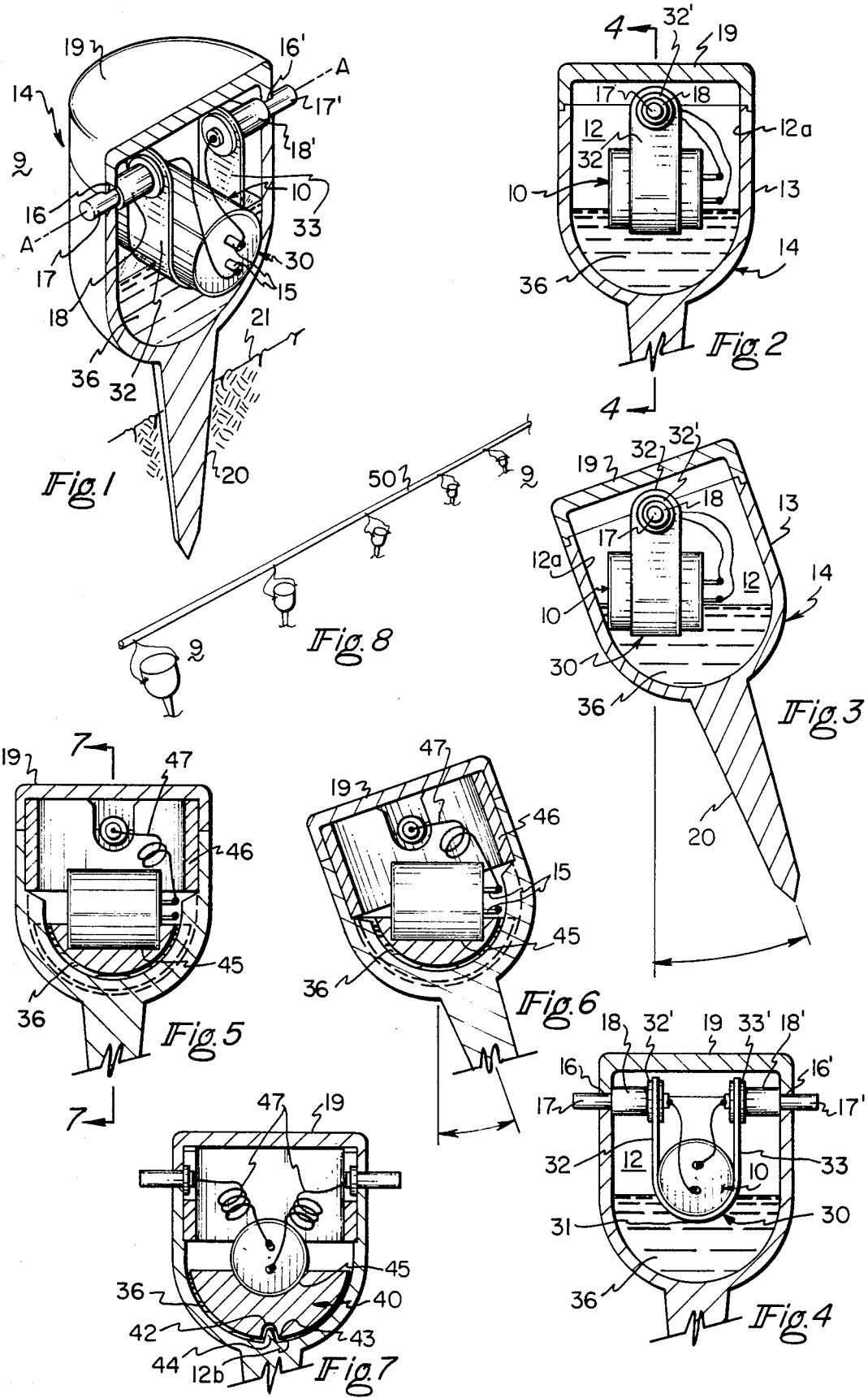

HORIZONTAL GEOPHONE TRANSDUCER ASSEMBLY

BACKGROUND OF THE INVENTION

1. Field of the Invention

A gimbal is used to support a seismic detector, such as a geophone, to give it free limited angular movement with a single degree of freedom in one direction about a horizontal axis.

2. Description of the Prior Art

In seismic prospecting, spread cables are used to interconnect strings of geophone transducers to seismic recording instruments. The geophone is mounted in a casing which is implanted into the earth to allow the geophone to detect returned seismic waves. Normally, geophones are planted upright so that they can detect only vertical earth motion. In recent years the need arose to record horizontal seismic waves as well and with geophones which are positioned horizontally instead of upright.

To plant a geophone so that its axis is substantially parallel to the horizontal is not an easy task. Conventionally, this is accomplished by outfitting each transducer with a level indicator which allows the operator to keep adusting the geophone planting until the axis of the geophone is approximately horizontal. Unfortunately, such a procedure is very time-consuming when considering that a seismic crew intending to detect horizontal waves normally utilizes several thousand of such horizontal geophone transducers.

The main object of the present invention is to eliminate the need of a level detector for each geophone transducer as well as to reduce substantially the cost of the labor associated with the present procedure for planting horizontal geophone transducers.

SUMMARY OF THE INVENTION

The geophone transducer comprises in combination: a geophone capable of detecting horizontal seismic waves, and a rigid casing having a gimbal chamber. A gimbal is provided inside the chamber on which the geophone is mounted for limited free angular movement in one direction only. The gimbal includes in one preferred embodiment a viscous liquid in which the geophone is only partially submerged while it is supported by a U-shaped bracket which is mounted for rotation about a fixed axis. In another embodiment, the geophone is mounted on a solid support which is allowed free limited angular movement in one direction only. In each embodiment, the gimbal freedom, that is, the tilt angle by the casing which houses the geophone relative to the vertical is limited to a range between 15° and 30°.

BRIEF DESCRIPTION OF THE DRAWINGS

FIG. 1 is an elevational sectional view of a geophone casing having a gimbal adapted to mount a horizontal geophone therein;

FIG. 2 is a view similar to FIG. 1 with the geophone viewed from a different angle;

FIG. 3 shows the geophone's permissible maximum angle of tilt relative to the vertical;

FIG. 4 is a view similar to FIG. 1 with the geophone viewed from its terminal end;

FIG. 5 illustrates a modified gimbal embodiment of the invention;

FIG. 6 is a view similar to FIG. 5 with the geophone casing shown tilted;

FIG. 7 is a view taken on line 7—7 of FIG. 5; and

FIG. 8 shows how the leader cables are connected to a seismic spread cable.

DESCRIPTION OF THE PREFERRED EMBODIMENTS

The geophone transducer assembly is generally designated as 9. It includes a horizontal geophone 10 which is housed inside a gimbal chamber 12 in the base portion 13 of a geophone casing 14. The geophone has a pair of terminals 15. The cylindrical wall 12a of chamber 12 has a pair of diametrically-opposed openings 16, 16' through which extend stiff sections of leader cables 17, 17', respectively. A cover 19 makes water-tight the chamber 12. Casing 14 is coupled to the ground 21 through a conical spike 20.

In one gimbal embodiment, geophone 10 is supported by a generally U-shaped bracket 30 which comprises a base 31 and two upright legs 32, 33. The outer ends of legs 32, 33 are rotatably mounted on suitable bearings 32', 33', respectively. Leaders 17 and 17' are fitted tightly within rigid sleeves 18, 18', which carry bearings 32', 33', respectively.

The longitudinal axis A—A of leaders 17 and 17' is the axis about which geophone 10 is allowed a limited free angular movement. The base 31 of the bracket 30 is partially submerged in a viscous liquid 36 which only partially fills the gimbal chamber 12.

Since the liquid maintains its surface horizontal in accordance with basic laws of physics, geophone 10 will also remain horizontal since it is free to rotate in one direction only so as to align its axis with the horizontal plane established by the free surface of the liquid for any position of casing 14 within a prescribed maximum tilt range, say between 15° and 30°. Then, at equilibrium geophone 10 assumes a horizontal attitude with respect to the free level of the liquid.

As the casing 14 tilts relative to the vertical, as shown in FIG. 3, the bracket 30 and hence the geophone mounted thereon will also rotate by an equal angular amount, so that the position of geophone 10 relative to the free surface of the liquid remains substantially the same in FIG. 3 as in FIG. 2.

The alignment of the axis of the horizontal geophone 10 with the surface plane of the liquid 36 ensures that the axis of the horizontal geophone will at all times be in alignment with the horizontal within the maximum permissible tilt range.

In the embodiment shown in FIGS. 5 through 7 instead of a liquid medium, there is shown a substantially semi-cylindrical base or carriage 40 having a U-shaped groove 42 extending in an axial direction along the entire length of its crest 43. A mating tongue or rail 44 projects outwardly from the bottom wall 12b of chamber 12. Carriage 40 is allowed only limited angular freedom of movement in the direction of rail 44 to compensate for the tilt of casing 14. Geophone 10 sits in an arcuate cavity 45.

Thus, the transducer assembly 9 of this invention allows the horizontal geophone 10, when its casing 14 is planted in the ground 21 within the maximum permissible angle of tilt, to level itself by gimbal action, such that the angle of the geophone's axis with respect to the horizontal will be less than 1°. The accuracy of such a plant greatly exceeds the plant conventionally made by using a level indicator. As a result, not only is the plant made with the transducer assembly 9 greatly improved, but also the labor expense associated with the conventional practice of using level indicators is greatly reduced.

Inside the gimbal chamber 12, the tilting of the geophone is limited by the cylindrical wall 12a of the gimbal chamber (FIG. 3) in the case of the liquid, and by an abutment sleeve 46 in the case of the solid base 40.

Electric connections to the geophone's terminals 15 are made by electrically soldering the terminals to flexible wires 47 which are connected to the leader cables 17 and 17'.

The manner of assembly and disassembly of the transducer 9 should be obvious from the drawings. The leader sections 17 and 17' are made to pass through the bores 16, 16' of casing 14. The cover 19 is coupled to the base 13 in any suitable manner, whereby the base and cover will sealingly engage the outer jackets of the leader sections 17 and 17', thereby rendering chamber 12 water-tight. Other known water-proofing means can be employed to make the casing water-tight. For such other water-proofing means and electric connections, reference is made to my co-pending patent application, Ser. No. 309,248 and now abandoned.

In FIG. 8 are shown a plurality of transducer assemblies 9 connected to a seismic spread cable 50.

The above and other advantages, as well as modifications of the preferred embodiments illustrated in the drawings, will readily become apparent to those skilled in the art.

What is claimed is:

1. A seismic transducer comprising in combination:
   a rigid casing having a gimbal chamber defining a bottom wall and means for coupling the casing to the ground to pick up the vibrations thereof;
   a horizontal geophone having a pair of terminals being disposed inside said chamber;
   a leader cable extending though the casing and means connecting the geophone terminals to said leader cable; and
   gimbal means positioned inside the casing chamber and adapted to maintain said horizontal geophone in a horizontal plane for within a predetermined tilt angle range of said casing relative to the vertical, said gimbal means being a medium partially filling said gimbal cavity and being adapted to support said geophone and to transmit vibrations from said ground to said geophone; and said gimbal means including:
   a carriage movably mounded on the bottom wall of said gimbal chamber for limited movement in one direction only in response to an angular tilt of said casing to thereby cause the angle of the geophone's vertical axis to become in substantial alignment with the horizontal.

2. The transducer of claim 1, wherein said carriage has a substantially semi-cylindrical cross-section and has a groove extending along its curved crest;
   a mating rail extending outwardly from the bottom wall into the gimbal chamber, said groove accepting said rail for limited movement therealong; and
   means inside said chamber for limiting the movement of said carriage to a predetermined maximum tilt angle of said casing.

3. The transducer of claim 2, wherein said maximum tilt angle is between 15 and thirty degrees.

* * * * *